Jan. 28, 1964  E. H. CARRUTHERS  3,119,395
CUTTER BANK FOR HARVESTERS FOR POD TYPE VEGETABLES
Original Filed Nov. 7, 1958  5 Sheets-Sheet 1
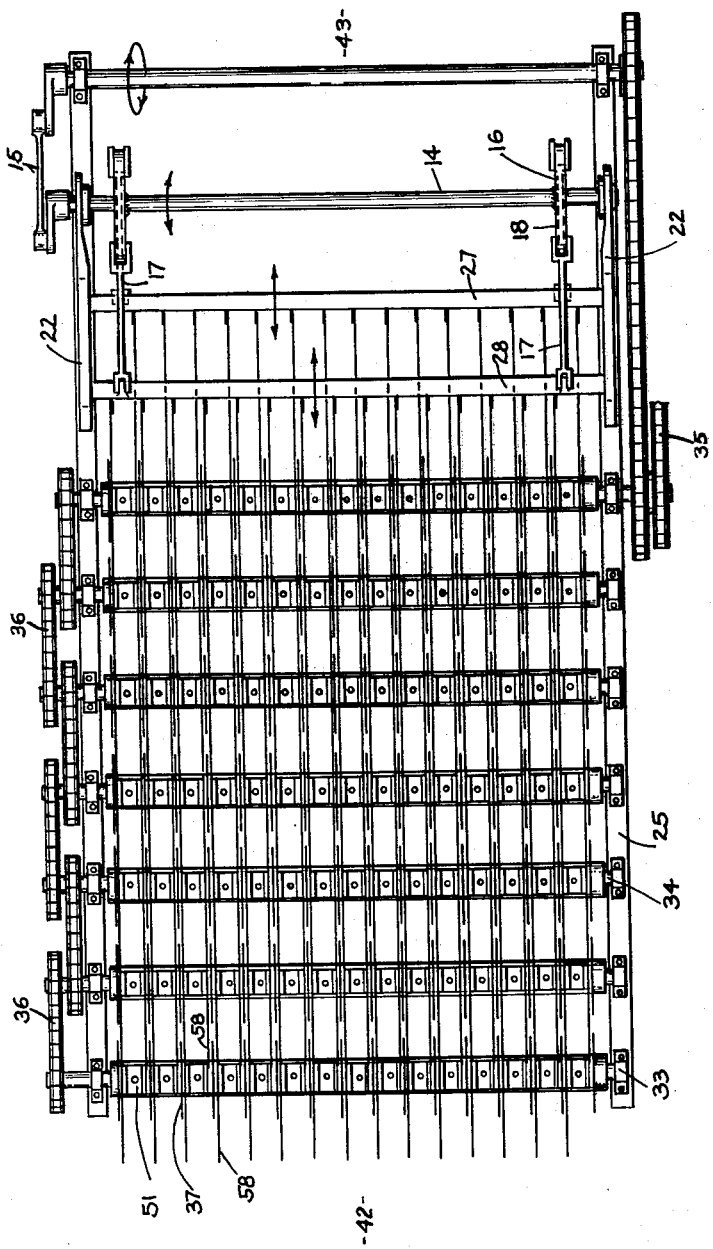
FIG. I
INVENTOR.
EBEN H. CARRUTHERS
BY
ATTORNEY Jan. 28, 1964     E. H. CARRUTHERS     3,119,395
CUTTER BANK FOR HARVESTERS FOR POD TYPE VEGETABLES
Original Filed Nov. 7, 1958     5 Sheets-Sheet 2
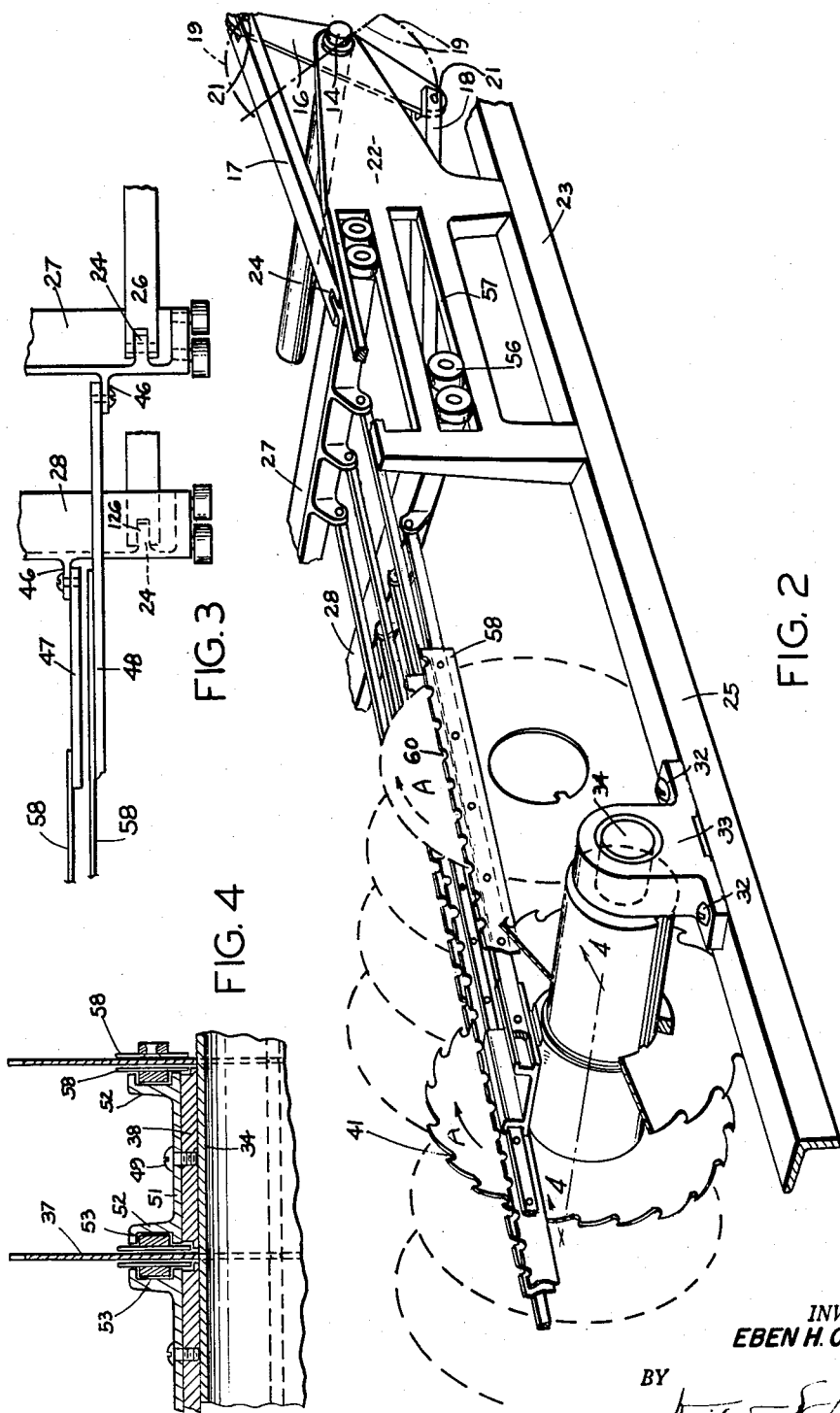
INVENTOR.
EBEN H. CARRUTHERS
BY
ATTORNEY

INVENTOR.
EBEN H. CARRUTHERS

INVENTOR.
EBEN H. CARRUTHERS
BY
ATTORNEY

United States Patent Office 3,119,395
Patented Jan. 28, 1964

3,119,395
CUTTER BANK FOR HARVESTERS FOR POD TYPE VEGETABLES
Eben H. Carruthers, Warrenton, Oreg., assignor to Chisholm-Ryder Co., Inc., Niagara Falls, N.Y., a corporation of New York
Continuation of application Ser. No. 772,462, Nov. 7, 1958. This application Aug. 4, 1961, Ser. No. 130,456
16 Claims. (Cl. 130—30)

This invention relates to harvesters for pod type vegetables and, more particularly, to a cutter bank for use in such machines for removing the pods from the vines and leaves so that the pod is substantially free of vines and leaves and may be separately collected for ultimate removal of the seeds from the pods for canning or freezing. This application is a continuation of my application Serial No. 772,462, filed November 7, 1958. Reference is made to my issued Patents Nos. 2,763,114; 2,943,430; 2,913,865 and 2,943,629.

In my above mentioned Patent No. 2,763,114, entitled Method for Harvesting Pod Type Vegetables, Cutting and Separating the Pods From the Stems and Leaves and Preparing the Vegetables for Canning or Freezing, and in Patent No. 2,943,430, entitled Machine for Harvesting Pod Type Vegetables, Cutting and Separating the Pods From the Stems and Leaves and Preparing the Vegetables for Canning or Freezing, I have shown and described a method and a machine for harvesting peas, lima beans and other pod type vegetables.

While the invention of this application has broader use, it will be described in connection with the harvesting of peas. For the purposes of this application, it is sufficient to state that the method and machine of the above patents include a movable conveyance, preferably self propelled, which is movable through the fields in a harvesting pattern. The machine carries, mounted thereon, means for removing substantially the whole pea plant from the field such as a sickle bar preferably mounted at the forward end of the machine; and a conveyor, conveyor reel or other means for carrying the substantially whole plants from the sickle bar to a cutter bed.

The cutter bed is of substantial width, preferably of a width corresponding to the width of the swath being cut from the field and is of substantial length to accommodate a multiplicity of cutting elements adapted to perform a multiplicity of rapidly repeated, successive cutting actions on the plants. The cutting or severing actions are adapted to cut the vines and leaves away from the pods so that the pods are substantially free of vines and leaves. The pods may then be separately collected by means located on the machine and the leaves and vines may be either spread back on the land or separately collected for use, for example, as cattle feed.

In so far as this invention is concerned, the means for separating the leaves and vines from the pods may be of any suitable type but preferably comprises a blower. The blower or fan directs an air blast through a falling stream of vines and leaves and pods, cut away from the vines and leaves, and separates the pods from the remainder of the plant by reason of the differences in specific gravity of the pods relative to the vines and leaves.

During the past six years, I have built a number of experimental harvesters for pod type vegetables. Many problems have been encountered and, while the basic principles of the method and machine shown and described in the above mentioned patents have not changed, many substantial changes have been made directed toward improving the performance of the machine; increasing the yield from a given acreage of peas; and the production of a reliable, commercially successful machine.

The most serious problems have been encountered in connection with the design of the cutter or severing bed. While the various cutters shown in the above mentioned patents, and others not shown which I have built and tested, are adequate to meet most of the following requirements, the cutter bed shown in this application improves upon the performance of the machine in most of the respects enumerated below. It solves some of the distinct problems which have remained, the most notable of which has been the clogging of the cutter bed with partly cut vines and leaves necessitating shutting down the machine at intervals to clean the cutter bed of material wrapped around elements of the cutter or severing bed or wedged between parts thereof.

In the following enumeration of the prerequisites or specifications of a cutter bed which have not necessarily been placed in the order of their importance, some of those enumerated are essential to a successful commercial machine while others may be characterized as highly desirable.

One of the important factors in designing a cutter bed is that the cutters must not damage, cut or open any material percentage of the pods passing through the machine. While a certain percentage of damaged pods is perhaps unavoidable, particularly since high speed operation is essential to a commercial machine, the percentage of damaged or cut pods must be maintained at a minimum. When the pods are damaged or cut, the peas, intended to be protected in the pods, are exposed to dust and loss of moisture. Any substantial percentage of damaged or cut pods defeats the purpose of the machine which is to radically change the present methods of pea harvesting and hold the peas protected in the pods until they are to be canned or frozen.

A second important aspect of the method and machine of my invention lies in cutting the vines and leaves by a multiplicity of successive and rapidly repeated cutting actions until the vines and leaves are in a relatively finely divided state. In such a finely divided state, the vines and leaves are less likely to clog the machine; readily pass through the cutter bed; and may be evenly spread over the swath just previously cut from the field for subsequent plowing under. The vines and leaves when plowed under are highly beneficial to the soil and their relatively even distribution over the land in a finely divided condition is much to be desired. This factor is extremely important to the farmer, particularly in pea growing areas where the vines and leaves cannot be sold profitably for cattle fodder as in areas of the country where dairying is a major industry.

A third important consideration in the design of a cutter bed is that it must be sufficiently open and nonclogging in operation to allow the pods which are substantially free of vines and leaves to drop through the cutter bed freely so that the pods are not exposed to the action of succeeding cutters which increases the possibility that the pods may be damaged. Moreover, the cutter bed should be sufficiently open so that vines and leaves, when they have been cut to a relatively finely divided condition, will drop or be forced through and below the bed so as to clear the cutter bed as promptly as possible to expose succeeding material or partially cut material traveling over the cutter bed to the cutting action of the cutting or severing elements. In other words, if the forward portion of the cutter bed reduces a part of the vines and leaves to a relatively finely divided condition and succeeds in producing some pods substantially free of vines and leaves, this material should drop or be forced below the level of the cutter bed to enable succeeding cutters to act upon uncut or only partially cut material.

Another important consideration in the design of the cutter bed lies in the fact that the pods should preferably be substantially stripped of vines and leaves. While the complete removal of vines and leaves from the pods is not entirely practical in the space limitations necessitated by the requirement that the machine shall not be excessive in size and weight, most of the pods should be reasonably free of vines and leaves. This aspect is important because any vines and leaves attached to the pods must be hauled to the cannery and must be disposed of there at greater expense. However, more important is the fact that if a substantial cluster of vines and leaves are left attached to a pod, the separation of the vines and leaves from the pods becomes more difficult because to secure adequate separation without pods being blown back on the land, there must be a difference in the specific gravity of the leaves and vines from the pods. When a cluster of vines and leaves is left attached to a pod, its specific gravity does not materially differ from a cluster of vines and leaves without pods. This results in blowing too large a percentage of pods back on the land with the vines and leaves and represents a waste of peas.

A further important consideration is that the cutters must be designed to at least assist in urging the material over the cutter bed; and the material to be cut should be maintained in a relatively loose, unmatted condition for exposure of the vines to the severing action of succeeding cutters. Moreover, the cutter bed must so support the material to be cut, except for material adequately cut adjacent the entrance end of the cutter bed, that before the material reaches the end of the cutter bed, each vine is exposed to the severing action of a number of cutter elements to thereby accomplish the removal of the maximum amount of vines and leaves from the pods possible within the limits of a practical machine insofar as size and weight is concerned. In addition, the action of the cutter bed must be fast because the machine is expensive to build and it must be capable of harvesting a number of acres of peas in a day.

Perhaps the most important factor distinguishing the cutter bed of this invention from those with which I have previously experimented in the comparative freedom of a cutter bed from clogging as a result of vines winding around elements of the cutter bed or being caught or jammed between relatively movable elements of the cutter bed. The cutter bed of this application is substantially self-cleaning and little or no necessity of shutting down the machine for the purpose of cleaning has been experienced, particularly when the elements of the cutter bed have been adequately lubricated. While the cutter beds with which I have previously experimented were designed and intended to be self-cleaning, the attainment of this objective was not always possible. These previous cutter beds depended upon a clean cut shearing action. So long as cutting by shear was maintained there was little or no tendency for clogging between the cutter disc and the shear blade. However, upon the occurrence of an imperfect shearing action, even a small amount of vine material lodged between the shearing elements would impair succeeding shearing actions. This usually resulted in a build up of material and a clogging of the bed particularly because no self-cleaning action was built into or accompanied the shearing action.

The objects of the invention are the overcoming of the above problems, particularly the design of a cutter bed so that it is substantially non-clogging and self-cleaning; so that the vines and leaves are relatively finely divided and the pods are substantially free of vines and leaves; and so that damage to the pods is reduced to a minimum.

Other objects and advantages of this invention will be particularly set forth in the claims and will be apparent from the following description, when taken in connection with the accompanying drawings, in which:

FIG. 1 is a top plan view on a relatively small scale showing the cutter bed of my invention;

FIG. 2 is a perspective side view of the upper or rear end of the cutter bed showing the driving mechanism for the reciprocating cutters;

FIG. 3 is a top plan view showing a part of the actuating mechanism for the reciprocating cutters;

FIG. 4 is a sectional view taken substantially on the line 4—4 of FIG. 2 in the direction indicated by the arrows;

Figure 10:
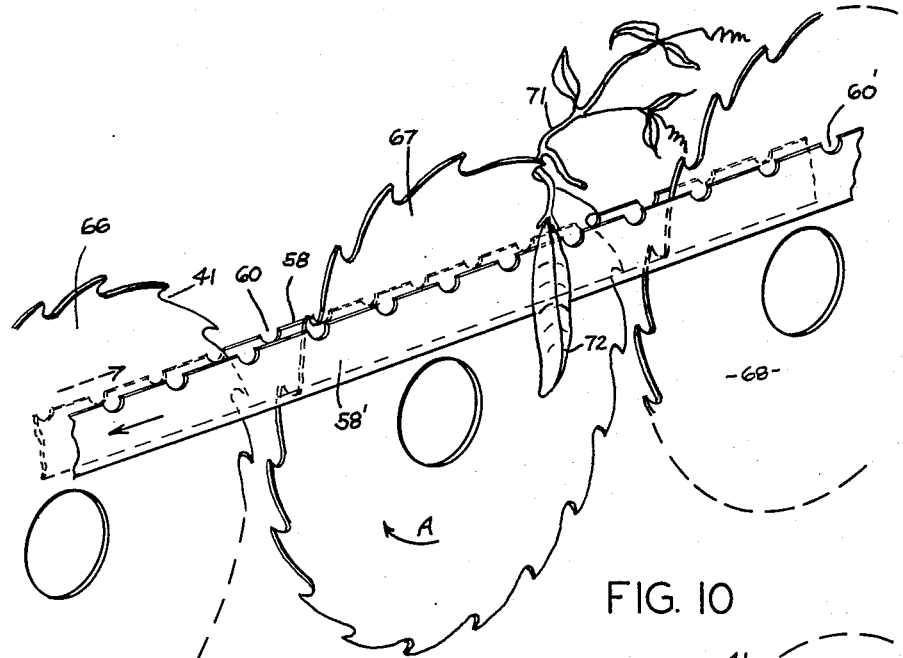
FIG. 10 is a perspective view showing two cutter bars on opposite sides of a series of cutter discs lying in the same plane illustrating how a vine is snagged, caught or grasped in a slot or opening in the periphery of a cutter disc.
Figure 11:
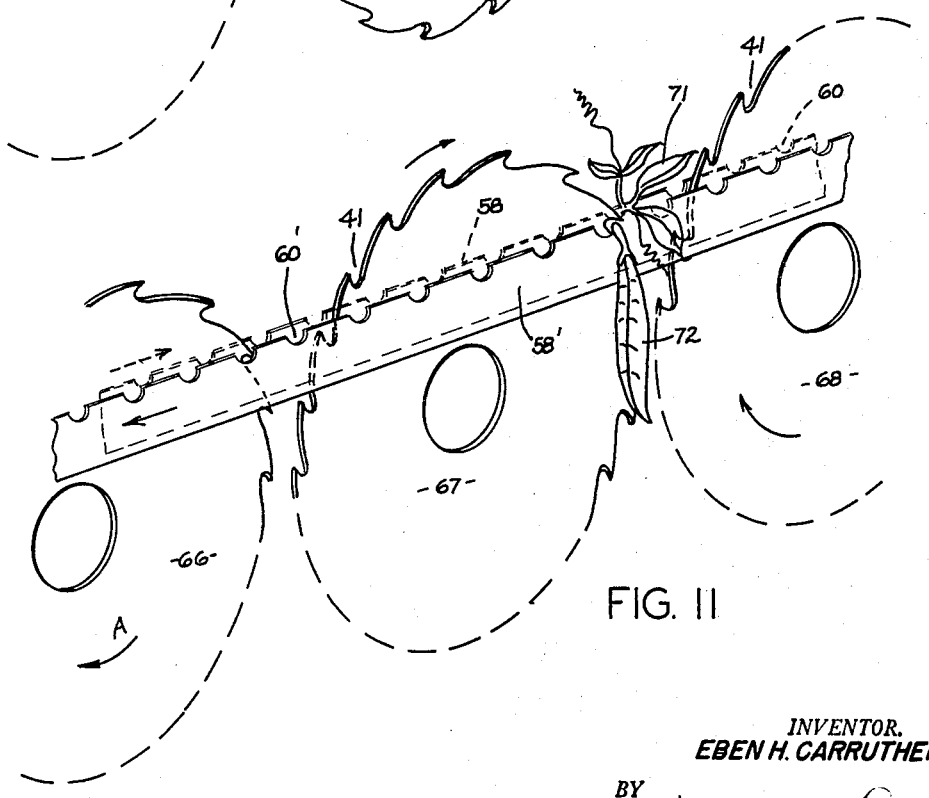
FIG. 11 is a view similar to FIG. 10 with the cutter discs rotated slightly so as to bring the vine of FIG. 10 into severing relation with the cutter bars.
Figure 12:
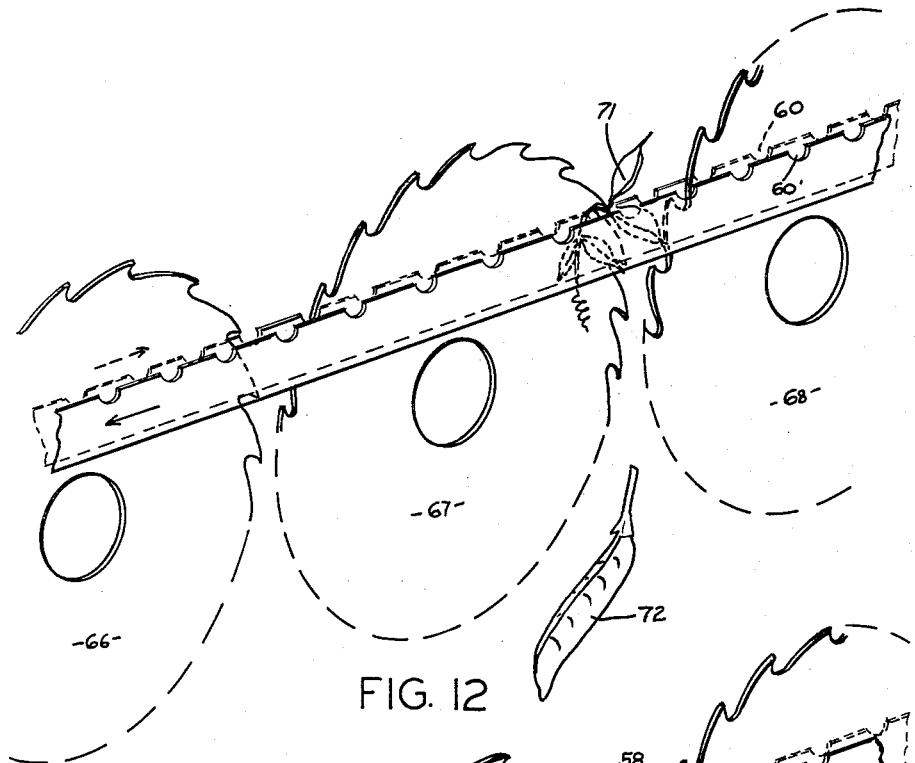
Figure 13:
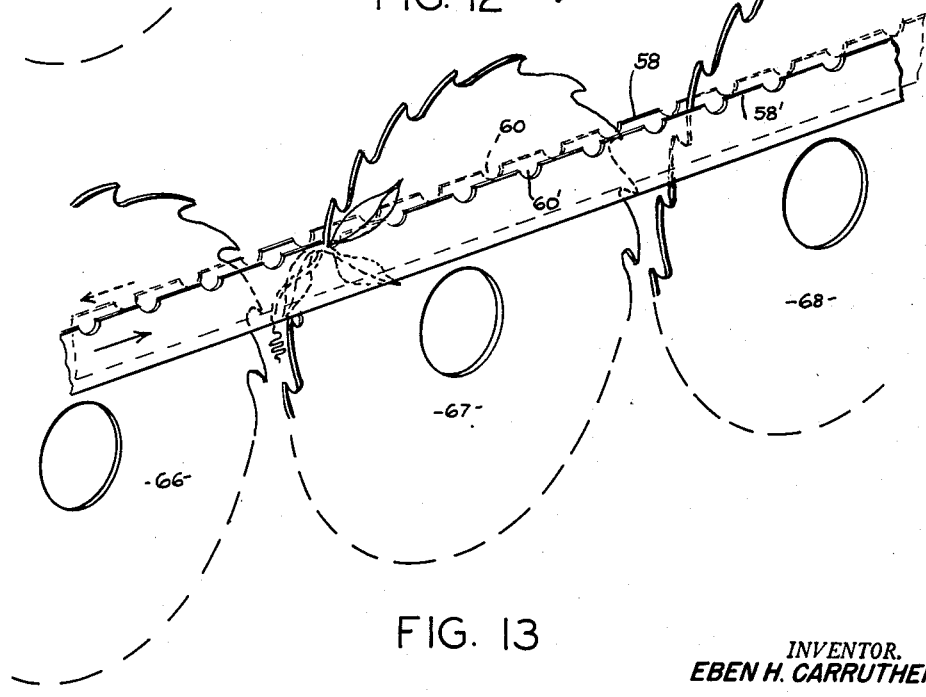

FIG. 12 is a view similar to FIGS. 10 and 11 but with the cutter discs rotated just slightly beyond the position shown in FIG. 11 illustrating how the pod is severed from the vine and illustrating how the vine and leaves may be caught or snagged between the cutter bars or between one of the cutter bars and the adjacent rotating disc; and FIG. 13 is a view similar to FIGS. 10, 11 and 12 and illustrates a position of still further rotation of the cutter discs and illustrates how the elements of the cutter bed clear themselves of vines and leaves so that the cutter bed is self-cleaning and for practical purposes non-clogging.

Many terms may be applied to the action which occurs when a section of a vine is divided into two parts such as cutting, severing, shearing, dissevering, chopping, slicing, breaking apart, tearing apart, etc. Some of these terms overlap in meaning and some of them are substantially synonymous. The specific action which occurs in the cutter bed of my invention is dependent, as will presently appear, upon the adjustment of the distance of cutting elements relative to each other. When the cutter discs and the reciprocating bars are closely spaced so that the cutter bars are substantially in sliding contact with the discs, an action occurs which may be described as cutting or shearing.

When the reciprocating cutter bars are spaced from the cutter disc to avoid contact between the reciprocating bars and the cutter discs an action occurs which may be more accurately described as a tearing apart of the vines. In the claims, the word "severing," a more nearly generic term, will be employed in a broad sense to define any action by which a length of vine is divided into two parts. In the preferred manner which the cutting elements of my novel cutter bed are spaced, the cutter elements tend to tear the vines apart by placing the vines in tension. In the more specific claims, the term "tearing" will be employed to describe this action which, insofar as I am aware, is novel and leads to important improvements in attaining positive separation of the vine parts; faster action in more rapidly exposing new vine parts to the action of the cutters; and a self-cleaning or self-clearing of the cutter parts to the end that only very infrequently do the vine parts build up in the cutter bed to an extent such as to require the machine to be shut down for cleaning.

Referring to the drawings, I have shown therein only the cutter bed and the operating parts for the cutter elements. It will be understood that the cutter bed of FIG. 1 is mounted on a machine adapted to travel through the fields. A self-propelled vehicle is preferred rather than a tractor drawn vehicle as shown in Patent No. 2,763,114. A walking beam shaft 14 is driven or oscillated by a crank and connecting rod assembly 15 (FIG. 1) from the motor of the machine. The shaft 14 through an oscillating walking beam driving element 16 rigidly secured to the shaft 14, operates a pair of reciprocating walking beam actuators 17 and 18.

As indicated by the dot and dash lines 19, the walking beam driving element 16 is oscillated through an arc and the actuators 17 and 18 are pivoted at 21 to the opposite ends thereof. As will be apparent from an examination of FIG. 2, the actuators 17 and 18 are reciprocated 180° out of phase with each other.

The walking beam shaft 14 is journaled in a pair of bearings mounted in a pair of pedestals 22 supported on the side rails 25 of a sub-frame 23. It will be understood that the sub-frame 23 is a separate frame carried by the main frame as illustrated, by way of example, in the above mentioned issued patent.

The ends of the actuators 17 and 18 are bifurcated, as shown at 24, to straddle bosses 26 formed on a pair of transversely extending walking beams 27 and 28. It will be understood that I have shown in detail in FIG. 2 only part of one side of the machine but that the assembly above described is duplicated on the other side of the machine, as indicated in FIG. 1. In FIG. 1, I have omitted some of the parts for the purpose of illustrating more clearly another aspect of the invention. Carried by the side rails 25 of the machine and rigidly secured thereto, as indicated at 32, FIG. 2, is a plurality of bearing supports 33. These bearing supports 33 located on opposite sides of the sub-frame are bored for the reception of bearings which carry shafts 34. The bearings are spaced along the side rails in accordance with the spacing desired between cutter discs presently to be described.

In FIG. 1, I have indicated a plurality of shafts 34 which are mounted in longitudinal spaced relation and extend transversely of the machine to define a cutter bed preferably of a width corresponding to the width of the swath being cut. Any desired number of transverse shafts may be employed, the number thereof being a matter of choice depending upon how many successive cutting actions the mass of material being harvested is to be subjected. In general, the number of transverse shafts is limited by the size and weight of the machine which may be practicably employed in the fields. The shafts 34 are driven from the vehicle motor by suitable gearing, chains or other means. The drive for the shafts 34 is illustrated in FIG. 1, and includes the drive chain 35 from the motor and the drive chains 36 to the shafts.

The shafts 34 are preferably of hollow construction to reduce weight and each has a plurality of cutter discs 37 keyed thereto as illustrated in the drawings (FIG. 2). The cutter discs are spaced from each other transversely of the shafts by spacing sleeves 38 which are loose with respect to the shafts but clamped endwise between the discs. It will now be understood that each shaft carries a multiplicity of cutter discs which are rotated at high speed by the shafts 34.

In practice, perhaps the first two shafts of the series of transverse shafts may be driven at a higher speed than the remainder of the shafts as it is desirable that immediately upon flow of the material onto the cutter bed, the material be subjected to a multiplicity of very rapidly repeated cutting actions. In general, it is desirable to reduce the mass of material rapidly at the entrance end of the cutter bed and operate the remainder of the cutter discs at a somewhat lower speed so that severance of the vines as close as possible to the pods will be accomplished. However, it will be understood that all the shafts may be driven at the same speed.

Each of the cutter discs is provided at its periphery with a multiplicity of slots 41. These slots have mouths or entrance openings at the periphery large enough to accept a vine but small enough at the periphery so that they will not accept a pod which is reasonably filled out with peas. The configuration of these slots and the purposes thereof have been fully set forth in the above mentioned patent. In FIG. 2 I have indicated by the arrows A the direction of rotation of the cutter discs 37 and as indicated these cutter discs rotate in a clockwise direction, as viewed in FIG. 2. The direction of their rotation together with the snagging or grasping of the vines by the slots 41 tends to urge the material along the cutter bed from the entrance end 42 (FIG. 1) thereof to the discharge end 43. While the cutter bed may be mounted horizontally in the machine, to facilitate entry of the mass and avoid too large lift from the ground to the cutter bed, preferably the cutter bed lies in an inclined plane rising from the entrance end 42 to the discharge end 43.

Pivoted on bosses 46 carried by the walking beams 27 and 28 are a plurality of actuated bars. These bars operate in pairs and one bar of each pair has been designated by the numeral 47 and the other bar of each pair by the numeral 48. Mounted on each of the spacing sleeves 38 by means of screws 49 are guides 51. Except for the end guides associated with the cutter discs on opposite sides of the machine, each of the guides has a pair of arms 52.

Each of the arms 52 has a groove or channel 53 formed on its outer face which defines a guide. The guide grooves 53 are open in the direction of the cutter discs and are adapted to receive the actuator bars 47 and 48. The actuator bars 47 and 48 extend the full length of the cutter bed and, through the guides and screws 49, hold the spacing sleeves against rotation. At the same time it will be observed that the guides are loose with respect to the actuator bars and some slight rotation of the sleeves 38 on the shafts 34 is permitted so that the guides will adjust themselves to the actuator bars and binding of the cutter bars in the guides is avoided.

For the purpose of forcing the actuator bars to reciprocate in straight lines each of the walking beams 27 and 28 has a pair of rollers 56 mounted on each of the opposite ends thereof. These rollers are confined to straight line motion by guides 57 formed in the pedestals on opposite sides of the machine. As will be observed from FIG. 2 the rollers are confined both above and below by the guides 57 thereby confining the walking beams 27 and 28 to planar movement.

Each of the actuator bars has a cutter or severing bar 58 secured thereto as by riveting or otherwise. These cutter bars extend substantially the full length of the actuator bars. If desired each cutter bar may be made in separate sections for ready removal and replacement. The cutter bars are secured to the actuator bars on the sides of the actuator bars which face outwardly from the guides 53 and thus may reciprocate freely without interference with the guides.

It will now be observed from an examination of FIG. 4 that each cutter disc 37 has a cutter bar 58 reciprocating on each side thereof and since the cutter discs are mounted in parallel planes longitudinally of the cutter bed, each pair of cutter bars encompasses a plurality of cutter discs. Moreover, it will be noted that each cutter bar defines a chord with respect to the planar face of each cutter disc.

Figure 5:
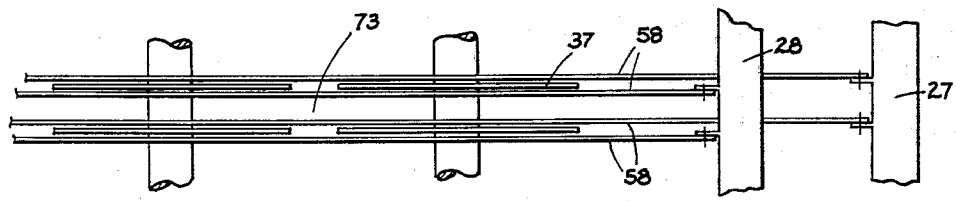
FIG. 5 is a top plan view of a portion of the cutter bed indicating one manner in which the reciprocating cutters may be reciprocated with respect to the rotatable cutter discs.
Figure 6:
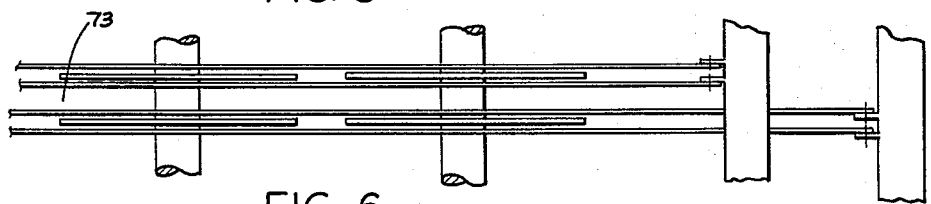
FIG. 6 is a view similar to FIG. 5 showing a modified way in which the reciprocating cutters may be reciprocated with respect to the cutter discs.
Figure 7:
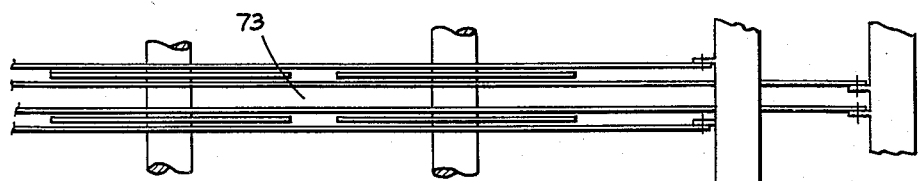
FIG. 7 is also a view similar to FIG. 5 showing another alternate way in which the reciprocating cutters may be actuated with respect to the cutter discs.

Referring now to FIGS. 5, 6 and 7, I have shown three arrangements of the cutter bars with respect to the cutter discs. The preferred arrangement of the cutter bars is shown in FIG. 5 in which the cutter bars on opposite sides of any particular cutter disc reciprocate in opposite directions. That is, the cutter bars on opposite sides of any particular cutter disc are pivotally attached to different walking beams 27 and 28 so that they reciprocate 180° out of phase with each other. In FIG. 6, the cutter bars on opposite sides of any particular cutter disc are attached to the same walking beam; reciprocate in the same direction at all times; are in phase with each other. The effect of the arrangement shown in FIG. 7 is essentially the same as the arrangement of FIG. 5 in that the cutter bars on opposite sides of any particular cutter disc are out of phase with each other but the cutter bars moving in the same direction are closer together than in the arrangement of FIG. 5. In FIG. 2, I have shown cutter bars in which each cutter bar has a multiplicity of notches 60 relatively closely spaced in its upper edge. The purposes of these notches will be later explained.

Figure 8:
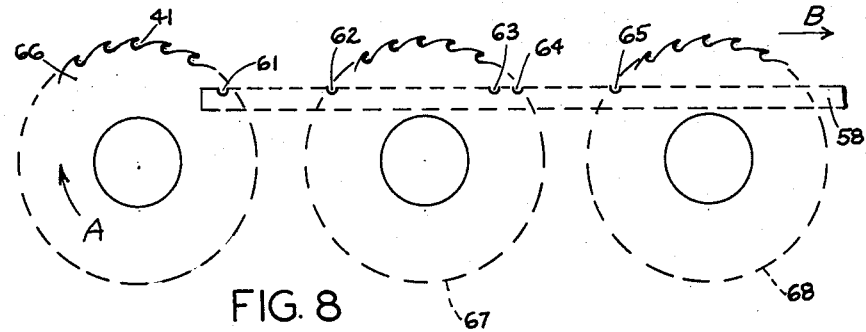
FIG. 8 is a view primarily schematic showing the action of one cutter bar with respect to a plurality of parallel cutter discs, the cutter bar being shown in the most rearward position which it occupies during its reciprocating movement.
Figure 9:
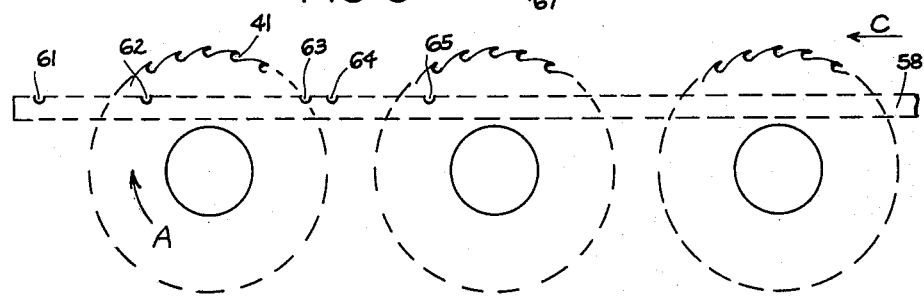
FIG. 9 is a view similar to FIG. 8 with the cutter bar shown at the forward extremity of its amplitude of movement, the two views (FIGS. 8 and 9) being included to illustrate how the cutter bed is rendered self-cleaning, and therefore substantially non-clogging.

In FIGS. 8 and 9, I have illustrated an important aspect of my invention. In FIG. 8, I have shown a cutter bar at the extreme right of its movement, the cutter bar having just completed a movement toward the rear of the machine as indicated by the arrow B. In FIG. 9, I have illustrated the position of the cutter bar at the extreme left of its movement, the cutter bar having just completed its movement toward the front of the machine as indicated by the arrow C. In these two views I have shown five reference notches on the cutter bar, indicated by the numerals 61, 62, 63, 64 and 65. I have also illustrated in these views three cutter discs 66, 67 and 68.

It will now be observed that each of the reference notches during the amplitude of its movement moves past a downwardly moving series of vine snagging slots 41 on a cutter disc and past an upwardly moving series of vine snagging slots on a cutter disc. For example, notch 61 in FIG. 8 is in alignment with the downwardly moving slots or teeth 41 on cutter disc 66. During movement of notch 61 from the position of FIG. 8 to that of FIG. 9, the notch 61 moves past a series of upwardly moving slots or teeth 41 on cutter disc 66. Likewise, notch 65 in FIG. 9 is shrouded in FIG. 9 but in moving from the position of FIG. 9 to that of FIG. 8 it moves past the downwardly moving series of slots or teeth on cutter disc 67 and past the upwardly moving slots or teeth on cutter disc 68. It will further be observed that the cutter bar defines a chord with reference to the planar face of each cutter disc and that the amplitude of movement of the cutter bar is greater than the length of this chord. The purpose of this amplitude of movement and the fact that each reference notch passes both a downwardly moving series of slots or teeth on a cutter disc and an upwardly moving series of vine snagging slots or teeth on a cutter disc will presently appear and will be apparent from FIGS. 10 to 13, inclusive.

In each of FIGS. 8 to 13, inclusive, I have shown the same three cutter discs 66, 67 and 68 and the cutter bars on opposite sides of these cutter discs which have been designated 58 and 58'. The notches of these cutter bars have been designated 60 and 60' respectively. In this series of views I have also shown a single vine and leaf structure with a pea pod attached. The vine and leaves thereof have been designated by the numeral 71 and the pod by the numeral 72. This single vine, pod and leaf structure is merely representative of a mass of such material passing over the cutter bed.

The cutter bars 58 and 58' may be mounted so that they have an intimate sliding fit with relation to the planar faces of the cutter discs. Under such conditions a shearing or clean cutting of the vines occurs. I am of the opinion that a running fit of the parts so as to provide a shearing action would be preferable in substantially all cases, the maintenance of this shearing relation has proven to be difficult as previously mentioned. To attain true shear, flat surface contact of the cutter bars with the faces of the cutter discs would have to be maintained. This shearing action in my preferred arrangement of parts is sacrificed to reduce surface friction between the cutter bars and the cutter discs. The spacing may be as much as one-eighth inch which reduces the mechaniscal precision required in the parts and avoids dulling or rounding off of the edges of the notches in the cutter discs.

The improved performance, accomplished by a definite spacing of the parts, manifests itself in a very material reduction in the amount of friction in the cutter bed and hence in a very substantial reduction in load on the source of power. Of importance also is the fact that lubrication of the parts is not critical. While some lubrication of the parts, particularly between the actuator bars and their guides, is desirable, operation will not be interrupted to any serious extent unless there is a complete absence of lubrication. In fact, water lubrication appears to be adequate. However, much more important is the fact that with the parts spaced, and the amplitude of the cutter bars, above described, the cutter bed may be characterized to a large extent as self-cleaning and self-clearing of cut material. I have endeavored to illustrate this action in FIGS. 10 to 13, inclusive.

Considering now FIG. 10, rotation of the center cutter disc in a clockwise direction, as indicated by the arrow A, results in one of the vines of the mass flowing over the cutter bed to be snagged or grasped. As previously mentioned, the mouths of the slots 41 are too small to accept a pod which is reasonably filled out with seeds. If a pod is in alignment with the cutter disc, the pod will be pushed aside and the adjacent vine 71 will be caught in the margins of the slot 41. Continued rotation of the cutter disc brings the vine and leaves, together with the pod 72, to the position of FIG. 1 in which position the vine is cooperatively acted upon by the cutter disc and the two cutter bars 58 and 58' moving, in the preferred form of the invention, in opposite directions.

It will be observed that the cutter bars are spaced from each other by the cutter disc. Moreover, in the preferred form of the invention these cutter bars are slightly spaced from the cutter disc and, therefore, there are no relatively moving edges adapted to exert a shearing action on the vines. It will be understood that the cutter discs are rotating and the cutter bars are reciprocating at a high speed and consequently it is difficult to see precisely what is occurring. However, I believe the following action occurs.

The vine is drawn or pulled down by the rotation of the cutter disc between the cutter bars and the vine is severed by an action which is best described as a "tearing" of the vines apart. The vines appear to be placed in tension and pulled or torn apart. Because of this tearing action, the vines are not severed by a clean cut and the fragments of vines and leaves, together with grass and weeds, become wedged between the rotating cutter disc and the reciprocating bars.

It will be understood that the cutter bed illustrated in FIG. 1, is covered by a mass of material moving from the entrance end of the cutter bed to the discharge end thereof. In the illustration of FIGS. 10 to 13, I have shown only a small fragment of vine and the vine is severed at a point close to the pod 72. Should this not be the case and severance is more remote from the pod so as to leave a substantial amount of leaves and vines still attached to the pod, the fragment thus cut, will continue to be carried along the cutter bed and be acted upon by succeeding cutter discs and cutter bars until the pods or the pods with a small fragment of vines and leaves attached thereto drop through or are pulled through the cutter bed. This severed material is deposited on a conveyor or draper belt (not shown) located immediately below the cutter bed. In FIG. 12, I have shown the pod dropping through the spaces in the cutter bed. These spaces are illustrated at 73 in FIGS. 5, 6 and 7 and their width will depend upon the size of the pods being harvested but, in general with peas, this space should be about seven-eighths of an inch to one inch wide.

One advantage of having the cutter bars reciprocate in opposite directions appears to be that when the pods are substantially free of vines and leaves, the opposite directional movement of the bars tends to line up the pods longitudinally of the spaces 73 so that the pods will more readily drop through the cutter bed. It will be understood that while the pods are partly protected by vines and leaves, they are less likely to be damaged by the cutting or severing elements but once they are free of this partial protection, it is important to avoid action upon them by succeeding cutter elements.

With vines, leaves and refuse material lodged or wedged between the cutter elements as illustrated in FIG. 12, I have found that continued rotation of the cutter discs and reciprocation of the cutter bars will not in and of itself clear the cutter bed in a positive manner. The material will tend to build up in the cutter bed, eventually clog the cutter bed and force a shutdown for cleaning. As previously described, the cutter bars are moved a distance greater than the chords which they subtend on the faces of the cutter discs. Let us assume the cutter bar 58 in FIGS. 12 and 13 is moving to the right while the cutter bar 58' is moving to the left. Material lodged between the cutter bar 58 and the cutter disc 68 will tend to move to the right and be freed in the space between the cutter bars. However, more likely it will be carried along by the cutter bar until it reaches the upwardly moving teeth or slots 41 on the cutter disc 67 which will lift the lodged material from a position between the cutter bar and the cutter disc to a position above the level of the cutter bed.

Material lodged between the cutter disc 68 and the cutter bar 58' will tend to move to the left being dragged by the cutter bar 58'. When this material reaches the other edge of the cutter disc 68, it will be acted upon by the notches or teeth 41 on the cutter disc moving in an almost oppositely moving direction from the teeth 41 on the opposite side of the cutter disc. The wedged fragments will then be caught and thrown in an upward direction clear of the cutter bed.

It will be understood that the cutter discs are rotating at a high rate of speed and the cutter bars are moving with relation to the discs at a high rate of speed. It is therefore not possible to determine with certainty what is occurring. However, experience has shown that, for the most part, the cutter bed is self-cleaning and self-clearing; a minimum amount of lubrication is required; and shutdowns for cleaning or to provide lubrication are infrequent. The notches on the cutter bar appear to be more important in assisting in the cutter bed clearing action than in aiding the severing action. Without the notches the clogged vines might not move with the cutter bars as readily and be released by the clearing action of the cutter discs above described.

In FIG. 1, I have shown the cutter bed as having a plurality of rows of cutter discs arranged transversely of the machine. The number of transverse rows of cutter discs is limited by the practical limits of the size and weight of the machine. This being the case, a proportion of the vines reach the end of the cutter bed without being cut sufficiently to drop through the cutter bed. Some of these vines have pods attached to them. If these vines are merely dumped over the end of the cutter bed and subjected to the action of the air separator, an unduly large number of pods may be carried with the air stream and deposited on the ground resulting in a waste of peas. I have found that this waste may be reduced if the last transverse row of cutter discs 76 is rotated in the opposite direction. However, most of the cutter discs must rotate so that the upper edges thereof move from the material entrance end of the machine toward the discharge end as the rotation of the discs and the snagging or grasping of the vines in the teeth thereof is the force which moves the mass of material over the cutter bed. Moreover, the cutter discs and cutter bars must be relatively closely spaced so that the cutter bed will support the mass of material until it is cut.

With the last row of cutter discs rotating in the opposite direction uncut material is interrupted in its passage longitudinally of the cutter bed and the last row of cutter discs has an opportunity to act upon the vines still having pods attached thereto and remove them. While there is some tendency for the material to pile up at the last row of cutter discs, this can be regulated by regulating or varying the speed of advance of the machine through the fields. When the material is divided finely enough, it is carried through the cutter bed and excess material accumulating in front of this row of cutter discs is carried beyond this row to a screw conveyor illustrated in the above mentioned patent. The screw conveyor extends transversely of the machine, is driven from the machine motor in any suitable manner and deposits the refuse material at the side of the machine. While this refuse material may contain some pods, the number thereof is a minimum; represents only a small proportion of the total harvest; and while they could be recovered, it is not economically practical to do so.

While I have shown and described the preferred forms of mechanisms of the invention, it will be apparent that various changes and modifications may be made therein, particularly in the form and relation of parts, without departing from the spirit of the invention as set forth in the appended claims.

I claim:

1. A cutter bed for removing vines and leaves from the pods of pod type vegetables comprising, in combination, a cutter disc having a plurality of slots extending inward from the periphery thereof, said slots adjacent the periphery being of sufficient width to accept a vine but insufficient to accept a pod, means for rotating said disc, a bar partly shrouding said disc and movable in vine severing relation thereto and means for reciprocating said bar in straight line motion, said bar having a plurality of notches therein and reciprocating in a plane parallel to the plane of the disc, said notches as the bar is reciprocated snagging the vines and carrying the vines with them and with respect to the disc.

2. A cutter bed for removing vines and leaves from the pods of pod type vegetables comprising, in combination, a cutter disc having a plurality of slots extending inward from the periphery thereof, said slots adjacent the periphery being of sufficient width to accept a vine but insufficient to accept a pod, means for rotating said disc, a bar partly shrouding said disc and movable in vine severing relation thereto and means for reciprocating said bar in straight line motion with an amplitude of reciprocation greater than the distance by which the bar shrouds the disc.

3. A cutter bed for removing vines and leaves from the pods of pod type vegetables comprising, in combination, a cutter disc having a plurality of slots extending inward from the periphery thereof, said slots adjacent the periphery being of sufficient width to accept a vine but insufficient to accept a pod, means for rotating said disc in a plane of rotation, a bar extending parallel to the plane of rotation of said disc and movable parallel thereto, means for reciprocating said bar in vine severing relation to said disc, means for confining said bar to straight line reciprocating motion, said bar defining a chord with respect to the disc and the amplitude of reciprocation of said bar being greater than the length of said chord.

4. A cutter bed for removing vines and leaves from pod type vegetable material, said cutter bed having a material entrance end and a material discharge end comprising, in combination, a multiplicity of cutter discs arranged longitudinally and transversely of the cutter bed in sufficiently close spaced relation so that a mass of unsevered material fed to the entrance end is at least partially supported by the cutter discs, each of said cutter discs having a plurality of slots therein of sufficient width to accept a vine but insufficient to accept a pod, means for rotating said cutter discs in a direction such that the upper edges thereof move in a direction from the entrance end toward the discharge end, a plurality of bars associated with said cutter discs, said bars and cutter discs cooperating with each other to produce a severing action on the vines.

5. A cutter bed in accordance with claim 4 in which the bars subtend chords on the discs and means are provided for reciprocating the bars through an amplitude of movement greater than the length of said chords.

6. A cutter bed in accordance with claim 4 in which the bars are notched along their upper edges and means are provided for reciprocating said bars, the notches together with the reciprocation thereof tending to snag the vines and carry them clear of the discs.

7. A cutter bed for removing vines and leaves from pod type vegetable material, said cutter bed having a material entrance end and a material discharge end comprising, in combination, a multiplicity of cutter discs arranged longitudinally and transversely of the cutter bed in sufficiently close spaced relation so that a mass of unsevered material fed to the cutter bed at the entrance end is at least partially supported by the cutter discs, each of said cutter discs having a plurality of slots therein of sufficient width to accept a vine but insufficient to accept a pod, a plurality of severing bars in slight spaced relationship to each of said cutter discs and shrouding said cutter discs, means for reciprocating said cutter bars, means for rotating said cutter discs at a high rate of speed and in a direction such that the upper edges thereof move in a direction from the entrance end toward the discharge end and the speed of rotation of the cutter discs and the snagging of the vines in the notches thereof urging the material rapidly over the cutter bed from the entrance end toward the discharge end and the cutter discs and the severing bars exerting a multiplicity of severing actions on the vines as the material moves from the entrance end toward the discharge end until the vines are in a relatively finely divided state and the pods are intact and substantially free of vines.

8. A cutter bed in accordance with claim 7, in which the amplitude of reciprocation of said severing bars is greater than the amount by which the severing bars shroud the cutter discs.

9. A cutter bed in accordance with claim 7, in which the amplitude of reciprocation of said severing bars is greater than the amount by which the severing bars shroud the cutter discs, said severing bars having a plurality of notches on the upper edges thereof to snag vines and carry them clear of the cutter discs.

10. A cutter bed for removing vines and leaves from the pods of pod type vegetables comprising, in combination a multiplicity of cutter discs mounted transversely and longitudinally of the cutter bed, said cutter bed having a material entrance end and a material discharge end, each of said cutter discs having a plurality of slots extending inward from the periphery thereof and each of said slots being of sufficient width to accept a vine but insufficient to accept a pod, means for rotating said discs in a direction such that the upper edges of the discs rotate from the entrance end toward the discharge end to snag the vines and propel a mass of said vegetable material over the cutter bed in the direction in which the cutter discs rotate, a plurality of bars, at least one of said bars moving in severing relation with each of said cutter discs and means for reciprocating said bars.

11. A cutter bed in accordance with claim 10 in which the cutter discs are mounted in transverse and longitudinal rows and rotate for the most part in the same direction, the last transverse row of cutter discs rotating in the opposite direction.

12. A cutter bed in accordance with claim 10 in which a pair of cutter bars are reciprocated in severing relation with each of said cutter discs and all of the cutter bars are reciprocated in the same plane.

13. A cutter bed in accordance with claim 10 in which a pair of cutter bars are reciprocated with relation to each of said cutter discs, and means for spacing said bars from the cutter discs a distance such that the cooperative action of the cutter bars with the discs tears the vines apart.

14. A cutter bed in accordance with claim 10 in which the bars subtend chords on each of the discs and the means for reciprocating the bars reciprocates them a distance greater than the length of the chords.

15. A cutter bed for severing and separating pods from their vines and leaves comprising, in combination, a plurality of peripherally slotted discs with their top portions rotatable in the direction of movement of the material, each of said discs having on at least one side and adjacent the upper portion thereof a notched bar, and means operatively connected to said bars for reciprocating the same in the direction of their lengths.

16. A cutter bed for severing and separating pods from their vines and leaves comprising, in combination, a plurality of peripherally slotted rotatable discs, said slots being of sufficient width to accept a vine but insufficient to accept a pod, each of said discs having on at least one side and adjacent the upper portion thereof a notched bar in severing relation therto, each of said bars defining a chord on the side surface of each disc and reciprocating means connected to each of said bars, the amplitude of reciprocation of each of the bars being greater than the length of said chord.

References Cited in the file of this patent

UNITED STATES PATENTS

| | | |
|---|---|---|
| 890,401 | Benthall | June 9, 1908 |
| 925,983 | Benthall | June 22, 1909 |
| 2,311,169 | Gordon et al. | Feb. 16, 1943 |
| 2,763,114 | Carruthers | Sept. 18, 1956 |